US006196438B1

(12) United States Patent
Kamps

(10) Patent No.: US 6,196,438 B1
(45) Date of Patent: Mar. 6, 2001

(54) FIXING MACHINE

(75) Inventor: Rolf Kamps, Wuppertal (DE)

(73) Assignee: YKK Europe Ltd., London (GB)

( * ) Notice: Subject to any disclaimer, the term of this patent is extended or adjusted under 35 U.S.C. 154(b) by 0 days.

(21) Appl. No.: 09/315,682

(22) Filed: May 20, 1999

(30) Foreign Application Priority Data

May 20, 1998 (DE) ........................................ 198 22 779

(51) Int. Cl.$^7$ ........................................ B23P 19/00

(52) U.S. Cl. ........................ 227/18; 227/15; 227/107

(58) Field of Search ........................ 227/18, 15–17, 227/31, 107; 29/119, 138, 798, 809

(56) References Cited

U.S. PATENT DOCUMENTS

| | | | | |
|---|---|---|---|---|
| 1,615,276 | * | 1/1927 | Hudson | 227/17 |
| 2,735,567 | * | 2/1956 | Carpinella | 227/18 |
| 3,069,688 | * | 12/1962 | Heil | 227/18 |
| 3,084,344 | * | 4/1963 | Schmidt | 227/18 |
| 4,923,099 | * | 5/1990 | Hasegawa et al. | 227/18 |
| 5,048,741 | * | 9/1991 | Toishi et al. | 227/18 |
| 5,339,984 | * | 8/1994 | Schmidt et al. | 227/18 |
| 5,463,807 | * | 11/1995 | Hochhausl | 227/18 |
| 5,501,001 | * | 3/1996 | Kamps | 227/18 |
| 5,781,989 | * | 7/1998 | Schmidt | 227/18 |

FOREIGN PATENT DOCUMENTS

| | | |
|---|---|---|
| 2757908 | 6/1979 | (DE) . |
| 4408691 | 8/1995 | (DE) . |
| 4408694 | 10/1995 | (DE) . |
| 195 81 758 | 2/1998 | (DE) . |
| 368581 | 3/1932 | (GB) . |
| 2253178 | 9/1992 | (GB) . |

* cited by examiner

*Primary Examiner*—Peter Vo
*Assistant Examiner*—Jim Calve
(74) *Attorney, Agent, or Firm*—Friedrich Kueffner

(57) ABSTRACT

A fixing machine with a machine frame, a feeding tool attached to the machine frame, and a fixing tool also attached to the machine frame is provided. The fixing tool can be operated for fixing by fixing elements moved into a fixing position on a support. The feeding tool can be operated for transferring the fixing elements into the fixing position, and can be moved back and forth by a drive element which is rotatable about a drive axis stationary relative to the machine frame. The feeding tool has a feeding rocker which is pivotable about a pivot axis stationary relative to the machine frame. A coupling element is coupled in an articulated manner to the feeding rocker and fastened to the drive element through a rotary joint. The rotary joint is rotatable with the drive element about the drive axis and has a joint axis extending parallel offset relative to the drive axis.

4 Claims, 7 Drawing Sheets

FIXING MACHINE

BACKGROUND OF THE INVENTION

1. Field of the Invention

The present invention relates to a fixing machine having a machine frame, a feeding tool attached to the machine frame, and a fixing tool also attached to the machine frame. The feeding tool is operated for transferring the fixing elements into the fixing position and may be moved back and forth by a drive element which is rotatable about a drive axis which is stationary relative to the machine frame. The fixing tool is operated for fixing fixing elements moved into a fixing position on a support.

2. Description of the Related Art

Fixing machines are used, for example, for fixing buttons, rivets or the like to articles of clothing. These fixing elements are generally constructed in two parts. For fixing such a two-part fixing element, a generally web-shaped support is usually initially moved into a predetermined position in which the support is arranged between the fixing position of the first fixing element part and the fixing position of the second fixing element part. The fixing element parts transferred into these fixing positions can then be connected to each other in a positively engaging manner by the fixing tool, wherein the support is clamped between the fixing element parts. For this purpose, the fixing element parts are usually conveyed from appropriate magazines through supply paths in feeding ducts and are conveyed within these feeding ducts with the feeding tool into the fixing positions.

In the fixing machine for fixing buttons or the like disclosed in DE 44 08 694 C1, a feeding tool is in the form of a plunger carriage which is moved back and forth along the feeding ducts by means of a centrally mounted Scotch-yoke mechanism. The plunger carriage is provided with a guide slot which extends transversely of the direction of movement, wherein a roller attached to the Scotch-yoke mechanism is received in the guide slot. The roller travels around the Scotch-yoke mechanism when the Scotch-yoke mechanism carries out a rotary movement and the roller traveling within the guide slot transversely of the direction of movement of the plunger carriage imparts reciprocal movement to the plunger carriage. By skillfully selecting the shape of the guide slot it is possible to produce the result that no force transmission takes place between the roller and the plunger carriage within a predetermined angle of the travel path of the roller around the Scotch-yoke mechanism. This makes it possible to provide a period of rest during which the plunger carriage remains in a return position without being moved. This period of rest can be utilized for conducting the fixing element parts into the feeding ducts.

When using known fixing machines, substantial developments of noise and vibrations can be observed even after a short period of operation. Similar problems occur in the fixing machine disclosed in DE 195 81 758 T1 and also intended for fixing buttons or the like. Reciprocal movement of the feeding tool is produced in this machine by a cam and by a connecting member which rests with a cam roller against the cam, wherein the cam roller rolls on the outer surface of the cam when the cam is rotated.

SUMMARY OF THE INVENTION

It is an object of the invention to provide a fixing machine of the above-described type which makes possible a long-term operation with minimal noise and vibrations.

In accordance with the invention, a fixing machine is provided with a feeding tool having a feeding rocker that is pivotable about a pivot axis which is stationary relative to the machine frame and a coupling element which is coupled in an articulated manner to the feeding rocker and is fastened to the drive element through a rotary joint, wherein the rotary joint is rotatable with the drive element about the drive axis and has a joint axis extending parallel offset relative to the drive axis.

The problems observed during the use of known fixing machines are primarily due to contaminations and damage of the guide surfaces of the guide slot within the plunger carriage or the outer surface of the drive cam required for coupling the feeding tool to the drive element. In accordance with the present invention, the conversion of the rotary movement of the drive element into a reciprocal movement of the feeding tool can be effected exclusively through rotary joints which are resistant to wear while avoiding guide surfaces which are susceptible to contamination and wear. This ensures a long-term operation of the fixing machine according to the invention with minimal noise and vibrations.

A period of rest of the feeding tool in a return position is advantageous for placing the fixing elements in the feeding ducts. A period of rest is achieved in DE 44 08 694 C1 by a special shape of the guide slot arranged in the plunger carriage. In accordance with the present invention, a period of rest can be realized through the use of a connecting element coupled in an articulated manner to both the feeding rocker and the coupling element. On the side of the rotary joint facing away from the connecting element, the coupling element is connected in an articulated manner to a guide rocker which is pivotable about a second pivot axis which is stationary relative to the machine frame.

By adjusting the distances between the second pivot axis, the point of connection of the guide rocker to the coupling element, the joint axis of the rotary joint, the point of connection of the coupling element to the connecting element and the point of connection of the connecting element to the feeding rocker, it is possible to adjust the angle of rotation of the drive element over which the feeding rocker remains essentially in a position of rest in one of its points of return. Adjustment of the amplitude of the reciprocal movement of the guide rocker is accomplished by adjusting the distance between the joint axis of the rotary joint and the drive axis of the drive element.

A fixing machine according to the invention can be manufactured particularly inexpensively and the components of the machine reduced, if the drive element is used for driving both the feeding tool and the fixing tool. For this purpose, the fixing tool advantageously has a first pressing die coupled to the drive element and movable in a reciprocating manner with the drive element, wherein the fixing element moved into the fixing position can be pressed against the support by means of the first pressing die. It has been found to be particularly useful if the first pressing die is coupled to the drive element through a first crank drive. This first crank drive can be realized so as to be particularly resistant to wear if this first crank drive includes a first crank-rocker mechanism coupled in an articulated manner, preferably through a bent lever to the first pressing die, a first receiving ring fastened to the first crank-rocker mechanism, and a circular disc rotatably received in the first receiving ring and eccentrically fastened to the drive element.

As is well known, the fixing procedure can be optimized if the fixing tool has two pressing dies which can be moved back and forth opposite relative to each other. The fixing machine according to the present invention makes it possible to realize this advantageous fixing procedure particularly inexpensively if the second pressing die is also coupled to the drive element and, thus, is movable back and forth opposite to the first pressing die. The second pressing die can be coupled to the drive element through a second crank drive. Also in this case, a coupling which is particularly resistant to wear is achieved if the second crank drive includes a second crank-rocker mechanism connected in an articulated manner to the second pressing die, a second receiving ring fastened to the second crank-rocker mechanism, and a circular disc received rotatably in the second receiving ring and attached eccentrically to the drive element.

A particularly compact construction of the fixing machine can be realized if both circular discs are fastened to the drive element in the direction of the axis of rotation next to each other, wherein the surface normals of the circular discs extend parallel to the drive axis. The reciprocal movements of the feeding tool and the pressing dies can be adapted to each other by selecting the fastening points of the circular discs and the rotary joint at the drive element. The rotary joint can also be fastened to one of the circular discs.

The various features of novelty which characterize the invention are pointed out with particularity in the claims annexed to and forming part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
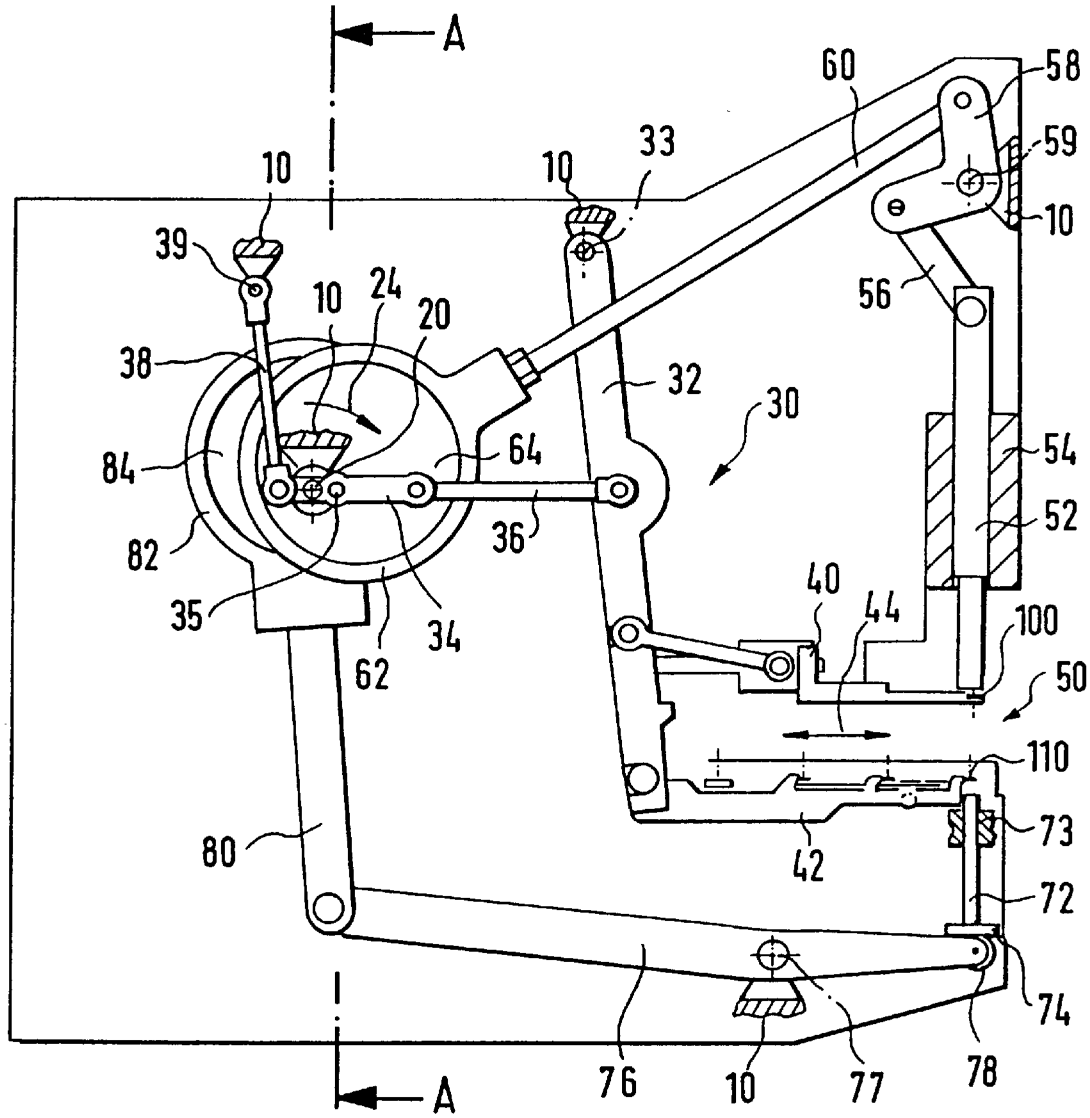
FIG. 1 is a schematic side view of a fixing machine according to the invention.
Figure 2:
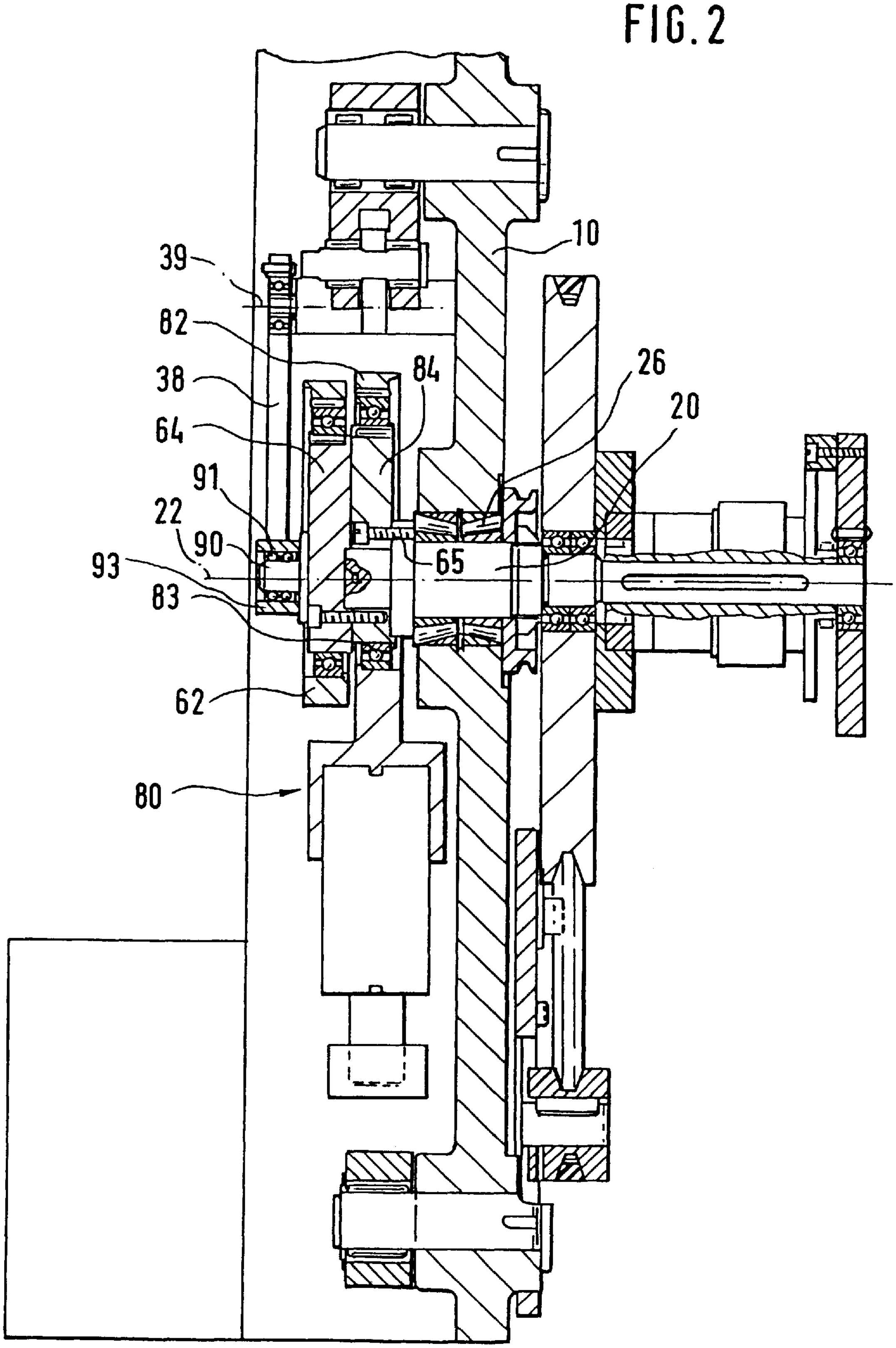
FIG. 2 is a sectional view of the fixing machine according to FIG. 1 taken along sectional plane A—A indicated in FIG. 1, FIGS. 3*a* to 3*d* are schematic illustrations showing the sequence of movement of a fixing machine according to the invention.

The fixing machine illustrated in FIGS. 1 and 2 essentially includes a machine frame 10 (schematically indicated only in FIG. 1), a drive element in the form of a principal drive shaft 20, a feeding tool 30 coupled to the principal drive shaft 20, and a fixing tool 50 which is also coupled to the principal drive shaft 20.

The principal drive shaft 20 is attached through a roller bearing 26 (see FIG. 2) to the machine frame 10 and is rotatable about a drive axis 22 which is stationary relative to the machine frame 10 in the direction indicated by arrow 24.

The feeding tool 30 includes a feeding rocker 32 which is pivotable about a pivot axis 33 which is stationary relative to the machine frame 10, a connecting rod 36, a coupling element 34 and guide rocker 38. The coupling element 34 is fastened through a rotary joint 35 to the principal drive shaft 20, wherein the rotary joint is rotatable with the principal drive shaft 20 about the drive axis 22 and has a joint axis extending parallel offset relative to the axis of rotation. The coupling element 34 is connected in an articulated manner to the feeding rocker 32 on one side of the rotary joint 35 through the connecting rod 36 and is connected in an articulated manner to the guide rocker 38 at the other side of the rotary joint 35, wherein, in turn, the guide rocker 38 is pivotable about a pivot axis 39 which is stationary relative to the machine frame 10. Finally, the feeding tool 30 also has an upper feeding plunger 40 connected in an articulated manner to the feeding rocker 32 and a lower feeding plunger 42 connected in an articulated manner also to the feeding rocker 32. By means of these feeding plungers 40 and 42, snap fastener parts introduced in appropriate feeding ducts (not shown) of the fixing machine can be moved into a fixing position located in the range of operation of the fixing tool 50, as indicated by the snap fastener parts 100 and 110 in FIG. 1.

The fixing tool 50 includes an upper die 52 guided linearly in a guide 54 and a lower die 72 also guided linearly in a guide 73. The upper die 52 is connected in an articulated manner through a connecting rod 56 to a leg of a bent lever 58. The other leg of the bent lever 58, which is pivotable about a pivot axis 59 which is stationary relative to the machine frame, is connected in an articulated manner to a crank-rocker mechanism 60 which is provided at its end located opposite the bent lever 58 with a receiving ring 62. A circular disc 64 attached eccentrically to the principal drive shaft 20 is rotatably received in the receiving ring 62.

The lower end of the lower die 72 is provided with a pressure plate 74, wherein a pressure roller 78 fastened rotatably to a lever 76 rests against the bottom side of the pressure plate 74. The lever 76 is pivotable about a pivot axis 77 which is stationary relative to the machine frame 10. At its end facing away from the pressure roller, the pivot lever 76 is connected in an articulated manner to a crank-rocker mechanism 80 which, in turn, is provided at its end facing away from the lever 76 with a receiving ring 82. A circular disc 84 fastened eccentrically to the principal drive shaft 20 is rotatably mounted in the receiving ring 82.

As illustrated in FIG. 2, the circular disc 84 is eccentrically slid onto the principal drive shaft 20 and is fixedly connected to the principal drive shaft 20 by means of a screw 65 extending through the circular disc 84. In addition, it can be seen in FIG. 2 that the circular disc 84 is mounted rotatably in the receiving ring 82 through a ball bearing 83.

As can additionally be seen in FIG. 2, the circular disc 64 is also eccentrically slid onto the principal drive shaft 20 and is fastened fixedly to the circular disc 84 by means of a screw extending through and received in the circular disc 84 and, thus, also fastened fixedly to the principal drive shaft 20. The circular disc 64 is rotatable relative to the circular disc 84 about the drive axis by an angle of rotation of about 30°. For this purpose, the circular disc 84 is provided with an appropriate oblong hole which receives the fastening screw. For ensuring a reliable fastening, the fastening screw can also be constructed in the form of a so-called double screw. Moreover, as can be additionally seen in FIG. 2, the rotary joint 35 is essentially composed of a pin 90 arranged on the surface of the circular disc 64 facing away from the circular disc 84 and a receiving ring 93 rotatably mounted on the pin 90 through a ball bearing 91.

By means of the fixing machine illustrated in FIGS. 1 and 2, an upwardly and downwardly directed movement of the upper die 52 and of the lower die 72 can be achieved by rotating the principal drive shaft 20 about the drive axis 22 and a reciprocating movement of the plungers 40 and 42 indicated by the double arrow 44 can also be achieved. The sequence of movements will be explained below with the aid of FIGS. 3*a* to 3*d* and 4.

Figure 3A:
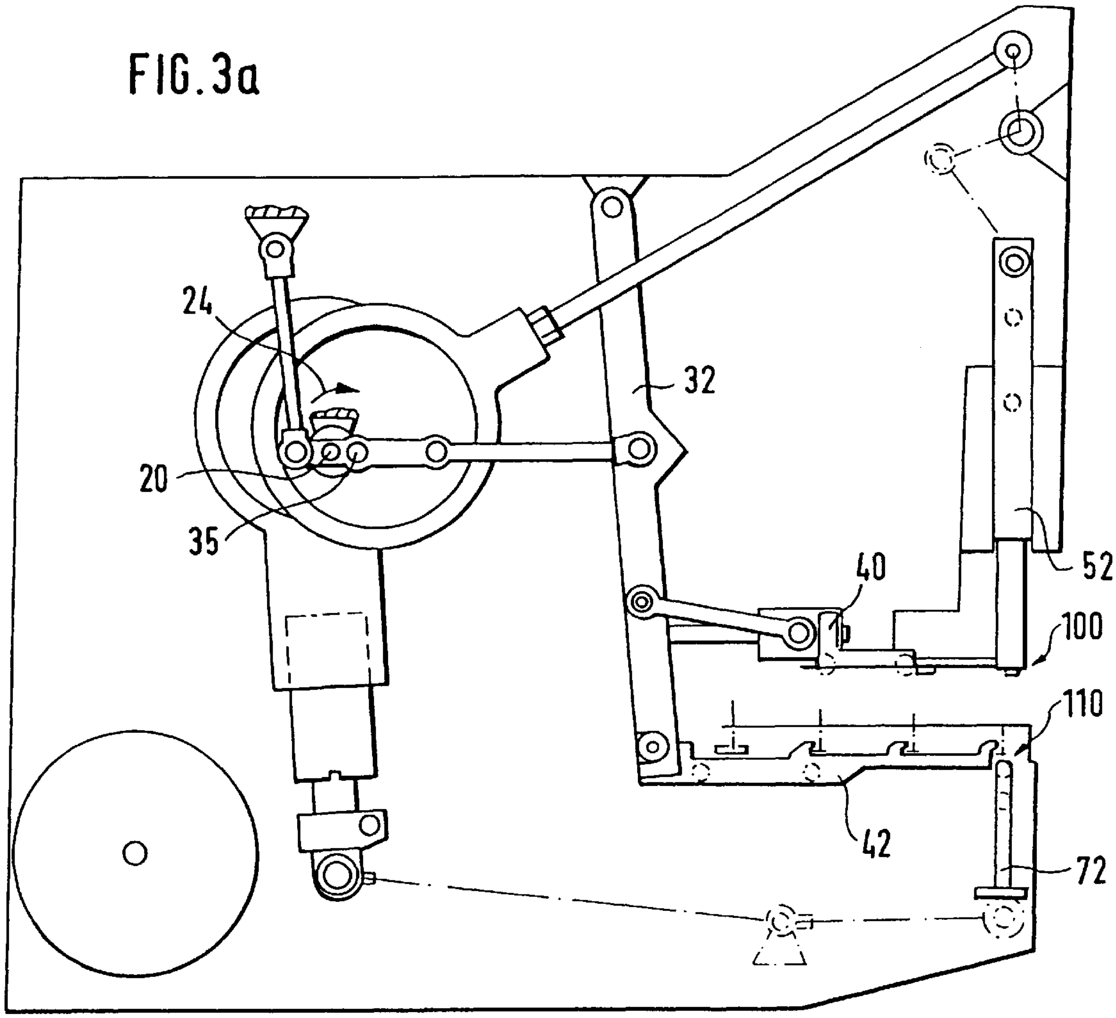

In the position of rotation illustrated in FIG. 3*a*, in which the rotary joint 35 is arranged on the side of the principal drive shaft 20 facing the feeding rocker 32, the feeding plungers 40 and 42 are in their front end positions, while the upper die 52 is approximately in its upper end position and the lower die 72 has reached approximately its lower end position. In this position, the fixing element parts 100 and 110 reach their fixing positions.

Figure 3B:
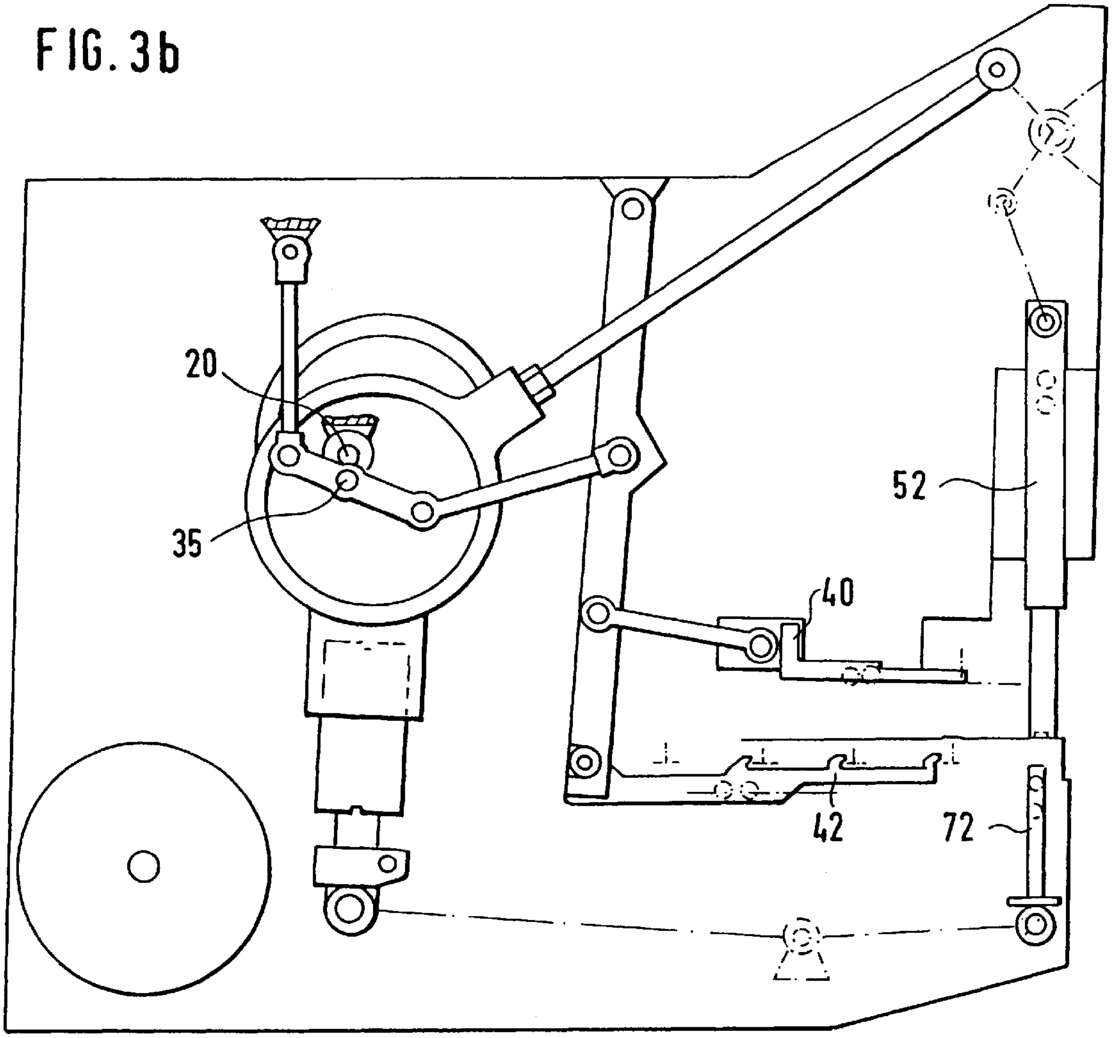

By rotating the principal drive shaft 20 by 90° in the direction indicated by the arrow 24, the position of rotation illustrated in FIG. 3*b* is reached. In this position of rotation, the rotary joint 35 is arranged below the principal drive shaft 20. The feeding plungers 40 and 42 have been pulled from the feeding position illustrated in FIGS. 3*a* out of the range of operation of the fixing tool and have already reached almost their rear end positions, while the upper die 52 and the lower die 72 have been lowered or raised, respectively, from the position illustrated in FIG. 3*a*.

Figure 3C:
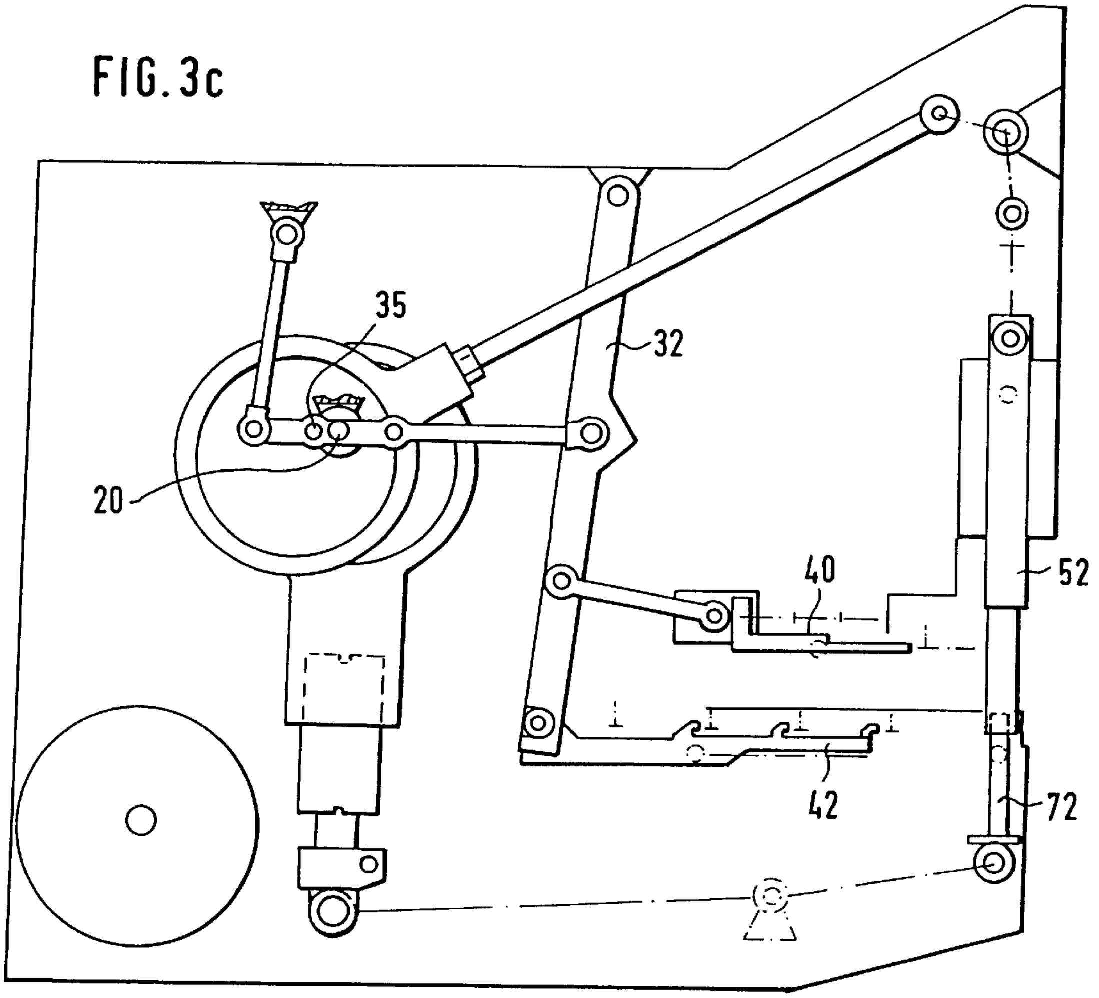

From this position, by rotating the principal drive shaft 20 by another 90°, the position illustrated in FIG. 3*c* is reached, in which the rotary joint 35 is arranged on the side of the principal drive shaft 20 facing away from the feeding rocker 32 in which the upper die 52 has reached approximately its lower end position, and in which the lower die 72 is located approximately in its upper end position, while the feeding plungers 40 and 42 remain approximately in their rear end position. In this position, fastening of the fixing elements to the support arranged between the upper die 52 and the lower die 72 takes place.

Figure 3D:
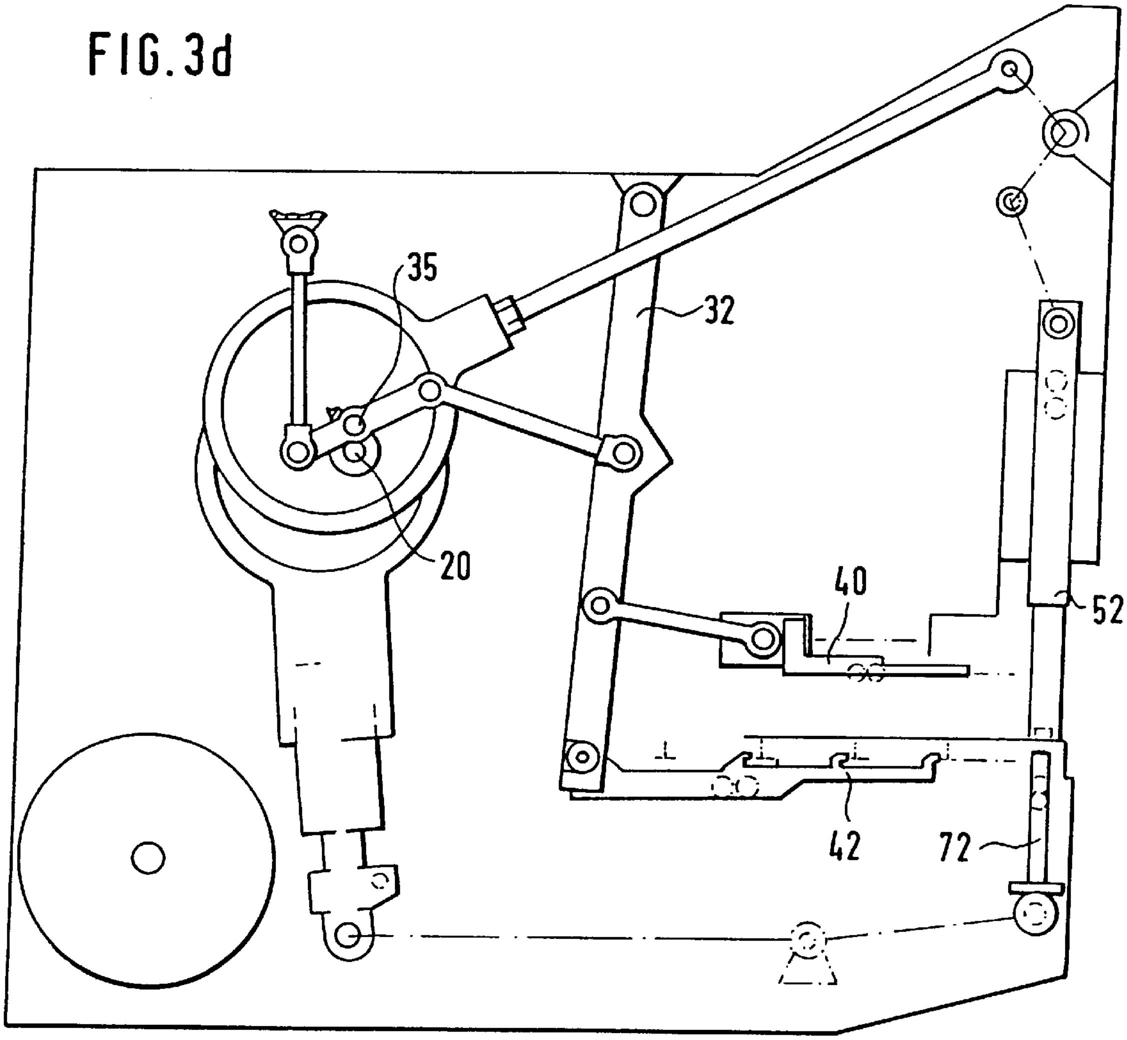

Finally, by rotating the principal drive shaft 20 by another 90°, the position of operation illustrated in FIG. 3*d* is reached in which the rotary joint 35 is arranged above the principal drive shaft 20. In this position of operation, the upper die 52 has already been once again somewhat lifted from its lower end position and the lower die 72 has been lowered from the upper end position, while the feeding plungers 40 and 42 still remain approximately in their rear end position.

Figure 4:
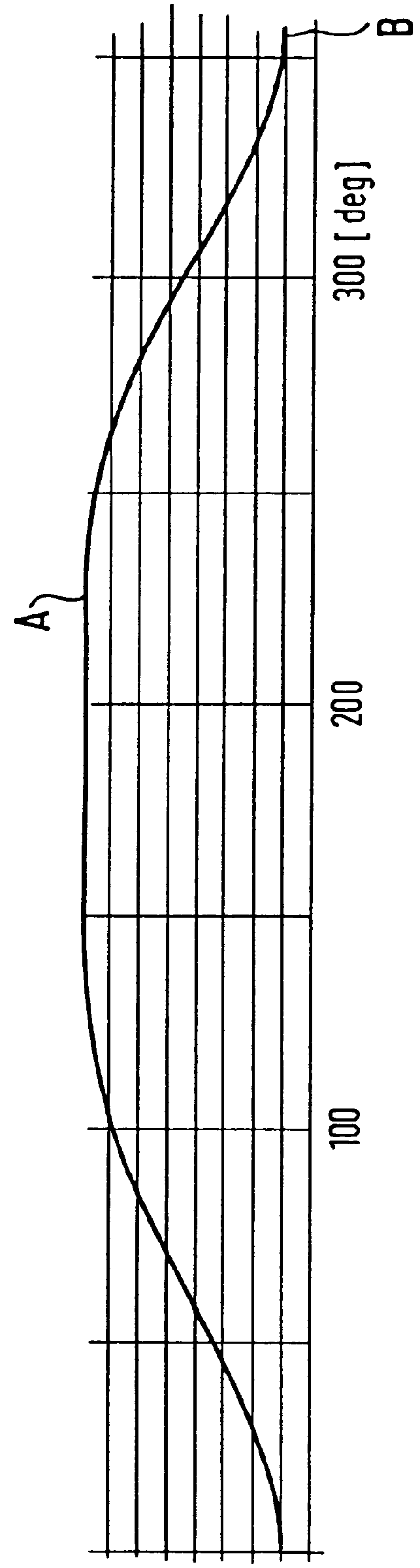
FIG. 4 is an illustration showing the sequence of movement of the feeding tool of the fixing machine according to the invention.

Referring now to FIG. 4, the movement of the plungers 40 and 42 is illustrated. Plungers 40 and 42 remain over an angle of rotation of the principal drive shaft 20 of about 150° in their rear end position A. Feeding plungers 40 and 42 are arranged only over a very small angular range in the area of their front end position B in the range of operation of the fixing tool 50. This ensures a problem-free operation of the feeding tool, which is made possible by coupling feeding rocker 32 to the principal drive shaft 20 through connecting element 36, the coupling element 34 and the guide rocker 38.

The present invention is not limited to the embodiment illustrated in the drawing. Rather, other embodiments effect the fixing procedure with only one pressing die and/or to fasten the rotary joint 35 directly to the principal drive shaft 20. Moreover, other linkage constructions can be used for actuating the fixing tool.

While specific embodiments of the invention have been shown and described in detail to illustrate the inventive principles, it will be understood that the invention may be embodied otherwise without departing from such principles.

What is claimed is:

1. A fixing machine, comprising a machine frame, a fixing tool attached to the machine frame, wherein the fixing tool can be operated for fixing fixing elements moved into a fixing position, a feeding tool attached to the machine frame, wherein the feeding tool is capable of being operated for transferring the fixing elements into the fixing position and being moved back and forth by a drive element rotatable about a drive axis stationary relative to the machine frame, and said feeding tool having a feeding rocker pivotable about a pivot axis stationary relative to the machine frame and a coupling element pivotally connected about a pivot axis to the feeding rocker and fastened to the drive element through a rotary joint, wherein the rotary joint is rotatable with the drive element about the drive axis and has a joint axis extending parallel offset relative to the drive axis, wherein the fixing tool has a first pressing die coupled to the drive element and movable in a reciprocating manner with the drive element, wherein the first pressing die is coupled to the drive element through a first crank drive, wherein the first crank drive includes a first crank-rocker mechanism pivotally connected about a pivot axis to the first pressing die, a first receiving ring fastened to the first crank-rocker mechanism, and a first circular disc rotatably received in the first receiving ring and eccentrically fastened to the drive element, wherein the fixing tool includes a second pressing die which is coupled to the drive element and is thereby movable back and forth opposite to the first pressing die, wherein the second pressing die is coupled to the drive element through a second crank drive, wherein the second crank drive includes a crank-rocker mechanism connected on one side pivotally about a pivot axis to the second pressing die and provided on another side with a second receiving ring, and a second circular disc which is rotatably received in the second receiving ring and is fastened eccentrically at the drive element, wherein the first a nd second circular disks are fastened next to each other on the drive element in the direction of the axis of rotation.

2. A fixing machine according to claim 1, wherein a connecting element pivotally connects about a pivot axis the feeding rocker to the coupling element and on the side of the rotary joint facing away from the connecting element, the coupling element is connected pivotally about a pivot axis to a guide rocker which is pivotable about a second pivot axis which is stationary relative to the machine frame.

3. A fixing machine according to claim 1, wherein the first crank-rocker mechanism is coupled through a bent lever to the first pressing die.

4. A fixing machine according to claim 1, wherein the rotary joint is arranged on one of the first and second circular discs.

* * * * *